United States Patent
Finger et al.

(10) Patent No.: US 8,939,382 B1
(45) Date of Patent: Jan. 27, 2015

(54) STEAM-HEATED FLUID PRESSURE WASHER SYSTEM

(75) Inventors: John W. Finger, Beresford, SD (US); Bradley A Hyronimus, Beresford, SD (US); Mark Kayne, Beresford, SD (US); Eric Hansen, Centerville, SD (US)

(73) Assignee: Sioux Corporation, Beresford, SD (US)

( * ) Notice: Subject to any disclaimer, the term of this patent is extended or adjusted under 35 U.S.C. 154(b) by 538 days.

(21) Appl. No.: 13/182,222

(22) Filed: Jul. 13, 2011

(51) Int. Cl.
*B05B 1/24* (2006.01)
*B05C 1/00* (2006.01)

(52) U.S. Cl.
USPC ........... 239/135; 239/136; 239/128; 239/127; 122/15.1; 95/158

(58) Field of Classification Search
CPC .... B05C 11/1042; B05C 5/001; B05C 11/10; B05C 3/005; B05C 5/0225; B05C 5/0237; B01D 53/60; B01D 53/77; B01D 53/78
USPC .............................. 239/128, 135; 95/158, 185
See application file for complete search history.

(56) References Cited

U.S. PATENT DOCUMENTS

| | | | | |
|---|---|---|---|---|
| 2,289,674 A | * | 7/1942 | Ofeldt | 239/67 |
| 3,556,402 A | * | 1/1971 | Wolking | 239/130 |
| 3,633,658 A | | 1/1972 | Kirschner | |
| 3,756,466 A | | 9/1973 | Haase | |
| 3,760,982 A | | 9/1973 | Haase | |
| 3,814,321 A | | 6/1974 | Mulholland | |
| 3,984,504 A | | 10/1976 | Pick | |
| 4,552,162 A | * | 11/1985 | Finger | 134/57 R |
| 4,732,712 A | | 3/1988 | Burnham | |
| 5,533,671 A | * | 7/1996 | Baer | 239/10 |
| 5,728,200 A | * | 3/1998 | Bekedam | 96/158 |
| 5,896,435 A | | 4/1999 | Gautier | |
| 6,082,712 A | | 7/2000 | Cincotta | |
| 6,164,557 A | * | 12/2000 | Larson | 239/75 |
| 6,435,424 B1 | | 8/2002 | Pauley | |
| 6,739,288 B1 | | 5/2004 | Kumamoto | |
| 6,983,723 B2 | | 1/2006 | Brewster | |
| 7,152,851 B2 | | 12/2006 | Cincotta | |
| 7,415,942 B2 | | 8/2008 | Kumamoto | |

* cited by examiner

*Primary Examiner* — Dinh Q Nguyen
(74) *Attorney, Agent, or Firm* — Jeffrey A. Proehl; Woods, Fuller, Shultz & Smith, P.C.

(57) ABSTRACT

A fluid heating system for heating and dispensing fluid in a primary fluid flow path is disclosed, and may include a reservoir defining an interior for holding a quantity of a fluid, with the interior being in fluid communication with the primary fluid flow path such that the quantity of fluid in the interior is able to flow into the primary fluid flow path. A primary pump may be configured to pump fluid in the primary fluid flow path, the primary pump being in fluid communication with the primary fluid flow path. A fluid dispensing device may be configured to selectively dispense fluid from the primary fluid flow path. A steam injection apparatus may be in communication with the interior of the reservoir device to inject steam into the interior to heat fluid located in the interior of the reservoir.

13 Claims, 1 Drawing Sheet

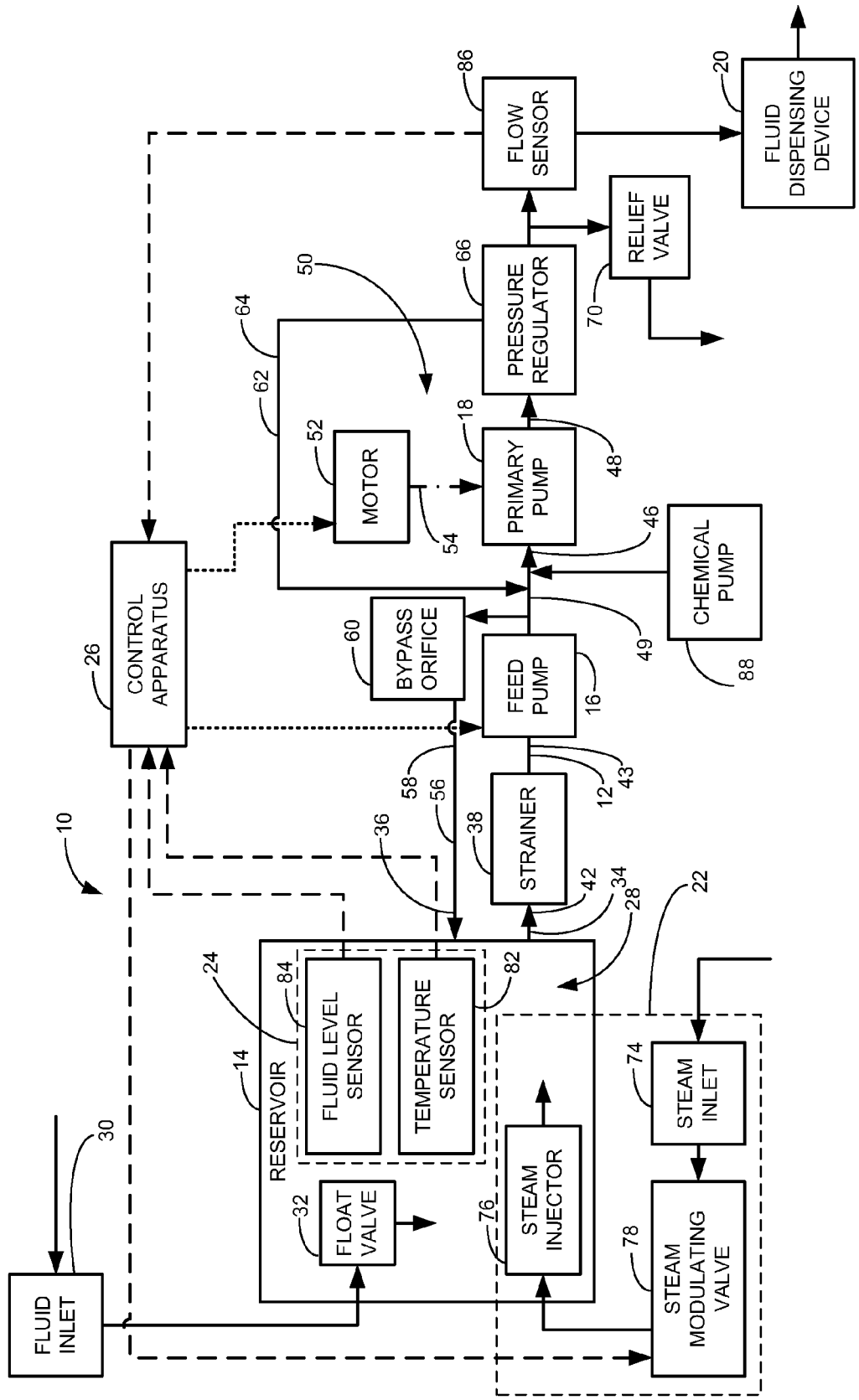

STEAM-HEATED FLUID PRESSURE WASHER SYSTEM

BACKGROUND

Field

The present disclosure relates to pressurized fluid cleaning systems and more particularly pertains to a new steam-heated fluid pressure washer system for providing a heated fluid pressure washing capability without requiring a combustion or high power electric source.

SUMMARY

In one aspect, the present disclosure relates to a fluid heating system for heating and dispensing fluid in a primary fluid flow path. The fluid heating system may comprise a reservoir defining an interior for holding a quantity of a fluid, with the interior of the reservoir being in fluid communication with the primary fluid flow path such that the quantity of fluid in the interior is able to flow into the primary fluid flow path. The system may further comprise a primary pump configured to pump fluid in the primary fluid flow path, the primary pump being in fluid communication with the primary fluid flow path, and a fluid dispensing device configured to selectively dispense fluid from the primary fluid flow path. The system may also comprise a steam injection apparatus in communication with the interior of the reservoir device to inject steam into the interior to heat fluid located in the interior of the reservoir.

In another aspect, the disclosure relates to a fluid heating system for heating and dispensing fluid in a primary fluid flow path. The fluid heating system may comprise a reservoir defining an interior for holding a quantity of a fluid, with the interior of the reservoir being in fluid communication with the primary fluid flow path such that the quantity of fluid in the interior is able to flow into the primary fluid flow path. The system may also comprise a primary pump configured to pump fluid in the primary fluid flow path, the primary pump being in fluid communication with the primary fluid flow path, and a feed pump configured to pump fluid in the primary fluid flow path, with the feed pump being in fluid communication with the primary fluid flow path to provide fluid flow to the primary pump. The system may further comprise a fluid dispensing device configured to selectively dispense fluid from the primary fluid flow path, with the fluid dispensing device including a manually-operated a spray gun, and a steam injection apparatus in communication with the interior of the reservoir device to inject steam into the interior to heat fluid located in the interior of the reservoir.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawing and the detailed description which follows. Such description makes reference to the annexed drawing wherein:

FIG. 1 is a schematic block diagram of a new steam-heated fluid pressure washer system according to the present disclosure.

DETAILED DESCRIPTION

With reference now to the drawing, and in particular to FIG. 1 thereof, a new steam-heated fluid pressure washer system embodying the principles and concepts of the disclosed subject matter will be described.

The disclosure relates to a fluid heating system 10 for dispensing fluid in a pressurized manner. The system 10 is able to heat a fluid such as water for pressurized cleaning without the need for combustion-based heating sources or even high power electric heating sources. Steam may often be available in locations where the use of combustion-based heating sources or electric heating sources is not practical, or not available. In most embodiments of the system, the fluid is water although the system may have application to other fluids. The fluid moves through the system 10 along a primary fluid flow path 12.

In general, the fluid heating system 10 comprises a reservoir 14 for holding a volume of the fluid, a feed pump 16 that draws fluid from the reservoir and raising the pressure of the fluid on the primary fluid flow path 12, a primary pump 18 further raising the pressure of the fluid, a fluid dispensing device 20 dispensing the fluid to the atmosphere in a useful manner, and a steam injection apparatus 22 providing steam to the reservoir to raise the temperature of fluid in the reservoir. A sensor assembly 24 may provide sense aspects of the operation of the system 10, and a control apparatus 26 that monitors and controls operation of the system 10.

In greater detail, the reservoir 14 defines an interior 28 for holding the fluid to be heated and dispensed, and the reservoir has a fluid inlet 30 for receiving fluid from a fluid supply source. In implementations where the fluid utilized in the system is water, the fluid inlet may be connected to a municipal or private water supply, although the disclosure is not limited to these fluid sources. A float valve 32 may be configured to control fluid flow into the interior from the fluid inlet 30. The interior 28 of the reservoir is in fluid communication with the primary fluid flow path 12, and the reservoir may have a fluid outlet 34 that is connected to the primary fluid flow path to provide the fluid communication. The reservoir may also have a bypass inlet 36, the purpose of which will be described below. The interior 28 of the reservoir may have a volume to accumulate a quantity of fluid, and the size of the interior of the reservoir and the volume of fluid that may be held in the interior of the reservoir may be sufficiently large so that efficient heat transfer can take place in the interior of the reservoir during operation of the system. The volume of the interior may also be sufficiently large so that water entering the fluid inlet 30 does not rapidly flow through the interior of the reservoir to the fluid outlet 34 during operation of the system 10 to facilitate the aforementioned heat transfer. In many preferred embodiments, the volume of fluid in the reservoir is such that flow out of the reservoir may be maintained for a finite period of time without need to introduce fluid into the reservoir through the fluid inlet 30 to maintain the flow. The reservoir thus maintains a supply of fluid that may be supplied to the primary fluid flow path 12 even when fluid is not entering into the reservoir. In many preferred embodiments, the reservoir has a capacity of approximately 5 gallons (approximately 19 liters) and larger, and may have a volume in the range of approximately 15 gallons (approximately 57 liters) to approximately 100 gallons (approximately 380 liters). In some applications, the capacity of the tank could be up to 5000 gallons (approximately 19000 liters) or more. It should also be appreciated that the capacity may be as small as approximately 2 gallons (approximately 7.5 liters).

A strainer device 38 may be in communication with the fluid outlet 34 of the reservoir and may be configured to remove undesirable materials such as overly large particles and debris from fluid flowing in the primary fluid flow path 12.

A feed pump 16 may be configured to pump fluid in the primary fluid flow path 12, and may thus be in fluid communication with the primary fluid flow path such that the feed pump receives fluid from the reservoir 14 through the primary fluid flow path. A first portion 42 of the primary fluid flow path may be located between the reservoir 14 and the feed pump 16, and a second portion 43 of the primary fluid flow path may be located after the feed pump in the primary fluid flow path. The feed pump 16 may provide an increased fluid pressure in the second portion 43 of the primary fluid path after the feed pump to feed the input of the primary pump to reduce the chance of cavitation (or boiling of the fluid) occurring at the primary pump. In some embodiments, such as implementations where the temperature of the fluid flowing through the primary pump 18 is relatively lower, the feed pump 16 may be omitted from the system 10. For example, in systems in which the primary pump may be fed fluid at temperatures over approximately 140 degrees F. (approximately 60 degrees Celsius), the feed pump may be utilized, and if the fluid temperature remains below that temperature level, then the feed pump may be omitted.

The primary pump 18 may be configured to pump fluid in the primary fluid flow path 12, and accordingly the primary pump is in fluid communication with the flow path 12. The primary pump 18 receives fluid from the feed pump 16 through the flow path 12 through an inlet 46 which is in fluid communication with the second portion 43 of the flow path 12, and the feed pump 16 may thus provide pressurized fluid to the inlet 46 of the primary pump. The primary pump 18 may also have an outlet 48, and the primary fluid flow path 12 may have a third portion 49 that is in communication with the outlet 48 of the primary pump.

The system 10 may also include a motor assembly 50 that is configured to drive the primary pump 18. In greater detail, the motor assembly may comprise a motor 52 that has a rotary output shaft, and a power transfer apparatus 54 that is configured to transfer power between the motor and the primary pump. In some illustrative embodiments, the power transfer apparatus 54 may comprise a driver pulley mounted on rotary output shaft of the motor, a driven pulley mounted on the primary pump, and a belt engaging the driver pulley and the driven pulley to transfer rotation between the pulleys. Other suitable means of transferring power may be employed.

The system 10 may also include a minor bypass loop 56 that is configured to return fluid from the primary fluid flow path 12 to the reservoir 14. The minor bypass loop 56 may function to maintain a minimum recommended flow rate of the feed pump. The minor bypass loop 56 may receive fluid drawn from the second portion 43 of the flow path 12 and the minor bypass loop may define a second fluid flow path 58. The minor bypass loop 56 may thus be in fluid communication with the primary fluid flow path 12 at a location between the feed pump 16 and the primary pump 18, and the bypass loop 56 may also be in fluid communication with the reservoir 14. The minor bypass loop 56 may include a bypass orifice 60 that functions to limit fluid flow through the second fluid flow path 58 from the primary fluid flow path 12. To accomplish this, the bypass orifice 60 may be in fluid communication with the primary fluid flow path and the second fluid flow path. The bypass orifice 60 may be configured to permit fluid in the primary fluid flow path to move to the second fluid flow path of the minor bypass loop when the pressure of fluid in the primary fluid flow path exceeds a first predetermined pressure level.

A major bypass loop 62 may be configured to permit fluid in the primary fluid flow path 12 that has passed through the primary pump to flow to a point of the primary fluid flow path before the primary pump in the fluid path. The major bypass loop 62 defines a third fluid flow path 64. The major bypass loop 62 may be in fluid communication with the third portion 49 of the primary fluid flow path and the second portion 43 of the primary fluid flow path.

The system 10 may also include a pressure regulator 66 that is configured to permit fluid flow from the primary fluid flow path 12 to the third fluid flow path 64 in a manner that is responsive to the magnitude of pressure of the fluid in the primary fluid flow path. The pressure regulator 66 may be in fluid communication with the primary fluid flow path 12 to thereby receive fluid flow from the flow path 12, and the pressure regulator 66 may be configured to permit fluid in the primary fluid flow path to move to the third fluid flow path of the major bypass loop 62 when the pressure of the fluid in the primary fluid flow path 12 exceeds a second predetermined pressure level. In some embodiment, the pressure regulator 66 may comprise a pressure unloader valve. The second predetermined pressure level may be in the range of approximately 100 psi (approximately 0.7 MPa) to approximately 10,000 psi (approximately 70 MPa).

The system 10 may also include a fluid dispensing device 20 which illustratively comprises a spray gun, although other dispensing devices may be employed. The spray gun may comprise a spray outlet and a flow valve which may be actuated by a trigger, such as a trigger configured to be actuated by the hand of a user holding the spray gun.

A relief valve 70 may be in fluid communication with the primary fluid flow path 12 and may be configured to expel fluid from the flow path 12 if the pressure of the fluid in the flow path 12 exceeds a third predetermined pressure. The third predetermined pressure level may be greater than the second predetermined level, and may be in the range of approximately 110 psi (approximately 0.75 MPa) to approximately 11,000 psi (approximately 75 MPa). The relief valve 70 may be in communication with the environment so that fluid is exhausted to the environment.

The system 10 further comprises a steam injection apparatus 22 that is in communication with the interior of the reservoir device in order to inject steam into the interior of the reservoir. The steam injection apparatus 22 may comprise a steam inlet 74 for communication with a steam source, and a steam injector device 76 may be positioned in the reservoir. The steam injector device 76 is in communication with the steam inlet 74. The steam injection apparatus 22 may further comprise a steam modulating valve 78 for controlling supply of steam to the steam injector device 76, and that may be in fluid communication with the steam inlet 74, and the steam modulating valve may be positioned between the steam inlet 74 and the steam injector device 76.

The injection of steam into the fluid in the interior of the reservoir functions to heat the fluid without the application of heat through, for example, a combustion flame or gases applied to the exterior or interior of the reservoir or an electric element extending into the interior of the reservoir. The steam exiting the steam injection apparatus 22 into the fluid tends to pull the relatively colder fluid in the reservoir around the steam and the colder fluid condenses the steam so that the steam takes on a fluid form. In the preferred implementations of the system, where the fluid comprises water, the steam thus simply adds to the volume of the water in the reservoir upon condensing.

A sensor assembly 24 may be configured to sense aspects of the operation of the system 10 for the purpose of controlling the system as well as communicating operating conditions to an operator. The sensor assembly 24 may comprise a temperature sensor 82 that is configured to sense a temperature of the fluid in the reservoir 14, and the temperature sensor be mounted on the reservoir and be in communication with the fluid in the reservoir. The temperature sensor 82 may generate a temperature signal that corresponds to the temperature of the fluid in the reservoir. The sensor assembly 24 may further comprise a fluid level sensor 84 that is configured to sense a level of the fluid in the reservoir, and may be mounted on the reservoir and may be in communication with the fluid in the reservoir. The fluid level sensor 84 may be configured to generate a fluid level signal that corresponds to the level of the fluid in the reservoir with respect to a reference fluid level, which may represent the level that correspond to a fluid level in the interior of the reservoir that is considered full or substantially full.

The sensor assembly 24 may comprise a flow sensor 86 that is configured to sense the flow of fluid through and out of the fluid dispensing device 20. The flow sensor 86 may be in fluid communication with the fluid dispensing device to receive the fluid that is flowing to the device 20. The flow sensor 86 may generate a flow signal that corresponds to the magnitude of fluid flowing through the fluid dispensing device 20.

The system 10 may also include a control apparatus 26 that is configured to control aspects of the operation of the system 10 based upon, for example, the input of the various sensors that signal the various aspects of the conditions of the system. Illustratively, the control apparatus 26 may be in communication with the temperature sensor to receive the temperature signal so that the temperature of the fluid in the reservoir is communicated to the control apparatus, and the control apparatus may thus control the introduction of steam into the reservoir steam modulating device based upon the fluid temperature, as well as other factors. The control apparatus may also be in communication with the fluid level sensor 84 to receive the fluid level signal from the sensor 84 so that the amount of fluid in the reservoir may be used as a factor to control the introduction of steam into the reservoir through the steam modulating valve 78. The control apparatus may further be in communication with the flow sensor 86 to thereby receive the flow signal from the sensor 86 and so that the primary pump 18 may be controlled by the control apparatus through the operation of the motor 52, and optionally operation of the feed pump may also be controlled responsive to the flow sensor signal.

The control apparatus 26 may be in electrical communication with the motor 52 to control operation of the primary pump 18 based upon the flow sensor 86. Further, the control apparatus 26 may be in electrical communication with the feed pump 16 to control operation of the feed pump 16 to control the flow of fluid through the feed pump to the primary pump, which may also be based upon the flow sensor signal. The control apparatus 26 may be in electrical communication with the steam modulating device 78 to control the supply of steam from the steam inlet 74 to the steam injector device 76 based upon, for example, the temperature signal from the temperature sensor 82, as well as other factors.

Optionally, the system 10 may include a chemical pump 88 injects a chemical, such as a cleaning solution, into the fluid flow path 12. In some preferred embodiments, the chemical pump adds the chemical outside of the major bypass loop 58

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A fluid heating system for heating and dispensing fluid in a primary fluid flow path, the fluid heating system comprising:

a reservoir defining an interior for holding a quantity of a fluid, the interior of the reservoir being in fluid communication with the primary fluid flow path such that the quantity of fluid in the interior is able to flow into the primary fluid flow path;

a primary pump configured to pump fluid in the primary fluid flow path, the primary pump being in fluid communication with the primary fluid flow path;

a feed pump in fluid communication with the primary fluid flow path before the primary pump and configured to pump fluid in the primary fluid flow path to the primary pump;

a fluid dispensing device configured to selectively dispense fluid from the primary fluid flow path;

a steam injection apparatus in communication with the interior of the reservoir device to inject steam into the interior to heat fluid located in the interior of the reservoir;

a major bypass loop in fluid communication with the primary fluid flow path before the primary pump and after the primary pump and configured to permit fluid on the primary fluid flow path after the primary pump to flow to the primary fluid flow path before the primary pump to maintain fluid flow through the primary pump when the fluid dispensing device is not dispensing fluid from the primary fluid flow path; and
a minor bypass loop in fluid communication with the primary fluid flow path between the feed pump and the primary pump and configured to return fluid from the primary fluid flow path to the reservoir.

2. The system of claim 1 wherein the fluid dispensing device comprises a spray gun.

3. The system of claim 1 wherein the reservoir has a fluid inlet for receiving fluid from a fluid supply source, a float valve being configured to control fluid flow into the interior from the fluid inlet, the reservoir having a fluid outlet in fluid communication with the primary fluid flow path.

4. The system of claim 1 wherein the steam injection apparatus comprises:
a steam inlet for communication with a steam source; and
a steam injector device in communication with the steam inlet and positioned in the reservoir.

5. The system of claim 1 additionally comprising a sensor assembly configured to sense parameters of the system, the sensor assembly comprising:
a temperature sensor configured to sense a temperature of the fluid in the reservoir and generate a temperature signal corresponding to the temperature of the fluid; and
a fluid level sensor configured to sense a level of fluid in the reservoir generate a fluid level signal corresponding to the level of the fluid in the reservoir with respect to a reference fluid level.

6. The system of claim 5 wherein the sensor assembly comprises a flow sensor in fluid communication with the fluid dispensing device and configured to sense flow of fluid through the fluid dispensing device and generate a flow signal corresponding to a magnitude of fluid flow through the fluid dispensing device.

7. The system of claim 6 additionally comprising a control apparatus configured to control operation, the control apparatus being in communication with the temperature sensor to receive the temperature signal, the control apparatus being in communication with the fluid level sensor to receive the fluid level signal, and the control apparatus being in communication with the flow sensor to receive the flow signal; and
wherein the control apparatus is in electrical communication with a motor operating the primary pump to control operation of the primary pump.

8. The system of claim 7 wherein the control apparatus is in electrical communication with the feed pump to control operation of the feed pump.

9. The system of claim 7 wherein the steam injection apparatus includes a steam injector device in communication with the steam inlet and positioned in the reservoir and a steam modulating valve controlling supply of steam to the steam injector device; and
wherein the control apparatus is in electrical communication with the steam modulating device to control supply of steam from the steam inlet to the steam injector device.

10. The system of claim 1 additionally comprising a bypass orifice in communication with the primary fluid flow path and the minor bypass loop to control fluid movement from the primary fluid flow path to the minor bypass loop when pressure of the fluid in the primary fluid flow path exceeds a first predetermined pressure level.

11. The system of claim 1 additionally comprising a pressure regulator configured to permit fluid flow from the primary fluid flow path to the major bypass loop in a manner responsive to the pressure of fluid in the primary fluid flow path.

12. The system of claim 1 additionally comprising a flow sensor in fluid communication with the fluid dispensing device and configured to sense flow of fluid through the fluid dispensing device and generate a flow signal corresponding to a magnitude of fluid flow through the fluid dispensing device, and a control apparatus in communication with the flow sensor to receive the flow signal and control operation of the primary pump based upon the magnitude of the fluid flow represented by the flow signal.

13. A fluid heating system for heating and dispensing fluid in a primary fluid flow path, the fluid heating system comprising:
a reservoir defining an interior for holding a quantity of a fluid, the interior of the reservoir being in fluid communication with the primary fluid flow path such that the quantity of fluid in the interior is able to flow into the primary fluid flow path;
a primary pump configured to pump fluid in the primary fluid flow path, the primary pump being in fluid communication with the primary fluid flow path;
a fluid dispensing device configured to selectively dispense fluid from the primary fluid flow path; and
a steam injection apparatus in communication with the interior of the reservoir device to inject steam into the interior to heat fluid located in the interior of the reservoir;
wherein the fluid dispensing device comprises a spray gun;
wherein the reservoir has a fluid inlet for receiving fluid from a fluid supply source, a float valve being configured to control fluid flow into the interior from the fluid inlet, the reservoir having a fluid outlet in fluid communication with the primary fluid flow path;
wherein the steam injection apparatus comprises:
a steam inlet for communication with a steam source;
a steam injector device in communication with the steam inlet and positioned in the reservoir; and
a steam modulating valve controlling supply of steam to the steam injector device;
a major bypass loop configured to permit fluid on the primary fluid flow path after the primary pump to flow to the primary fluid flow path before the primary pump;
a pressure regulator configured to permit fluid flow from the primary fluid flow path to the major bypass loop in a manner responsive to the pressure of fluid in the primary fluid flow path;
a feed pump configured to pump fluid in the primary fluid flow path, the feed pump being in fluid communication with the primary fluid flow path to provide fluid flow to the primary pump;
a minor bypass loop configured to return fluid from the primary fluid flow path to the reservoir, the minor bypass loop being in fluid communication with the primary fluid flow path between the feed pump and the primary pump;
a bypass orifice in communication with the primary fluid flow path and the minor bypass loop to control fluid movement from the primary fluid flow path to the minor bypass loop when pressure of the fluid in the primary fluid flow path exceeds a first predetermined pressure level;
a sensor assembly configured to sense parameters of the system, the sensor assembly comprising:
a temperature sensor configured to sense a temperature of the fluid in the reservoir and generate a temperature signal corresponding to the temperature of the fluid; and a fluid level sensor configured to sense a level of fluid in the reservoir and to generate a fluid level signal corresponding to the level of the fluid in the reservoir with respect to a reference fluid level;

a flow sensor in fluid communication with the fluid dispensing device and configured to sense flow of fluid through the fluid dispensing device and generate a flow signal corresponding to a magnitude of fluid flow through the fluid dispensing device;

a control apparatus configured to control operation, the control apparatus being in communication with the temperature sensor to receive the temperature signal, the control apparatus being in communication with the fluid level sensor to receive the fluid level signal, and the control apparatus being in communication with the flow sensor to receive the flow signal;

wherein the control apparatus is in electrical communication with a motor operating the primary pump to control operation of the primary pump;

wherein the control apparatus is in electrical communication with the feed pump to control operation of the feed pump; and wherein the control apparatus is in electrical communication with the steam modulating device to control supply of steam from the steam inlet to the steam injector device.

* * * * *